(12) United States Patent
Brzoskowski et al.

(10) Patent No.: US 6,221,964 B1
(45) Date of Patent: Apr. 24, 2001

(54) FOAMABLE POLYMERIC COMPOSITION

(75) Inventors: Ryszard Brzoskowski, Acton; Mohammed R. Sadeghi; Yundong Wang, both of Leominster, all of MA (US)

(73) Assignee: DSM N.V., Heerlen (NL)

( * ) Notice: Subject to any disclaimer, the term of this patent is extended or adjusted under 35 U.S.C. 154(b) by 0 days.

(21) Appl. No.: 09/425,210

(22) Filed: Oct. 22, 1999

Related U.S. Application Data

(63) Continuation of application No. PCT/NL98/00209, filed on Apr. 10, 1998
(60) Provisional application No. 60/043,331, filed on Apr. 15, 1997.

(30) Foreign Application Priority Data

Apr. 23, 1997 (EP) .................................... 97201186

(51) Int. Cl.⁷ ............................... C08F 8/00; C08L 9/00; C08L 9/02; C08L 47/00
(52) U.S. Cl. .......................... 525/191; 525/197; 525/232; 525/233; 525/238; 525/240; 525/241
(58) Field of Search ..................................... 525/191, 197, 525/232, 233, 238, 240, 241

(56) References Cited

U.S. PATENT DOCUMENTS

| 4,442,233 | 4/1984 | Lohmar et al. . | |
|---|---|---|---|
| 4,898,760 | 2/1990 | Halberstadt et al. . | |
| 5,605,936 | * 2/1997 | DeNicola, Jr. et al. | 521/50.5 |
| 5,824,400 | * 10/1998 | Petrakis et al. | 428/218 |

FOREIGN PATENT DOCUMENTS

| 28 39 733 B1 | 10/1979 | (DE) . |
|---|---|---|
| 0 637 604 A1 | 2/1995 | (EP) . |
| 8-151467 | 6/1996 | (JP) . |

* cited by examiner

Primary Examiner—Nathan M. Nutter
(74) Attorney, Agent, or Firm—Pillsbury Winthrop

(57) ABSTRACT

The invention relates to a foamable polymeric composition, comprising a thermoplastic elastomer on the basis of a polyolefin and a rubber; the invention is characterized in that the polyolefin is a polypropylene homo- or copolymer having:

a weight average molecular weight, $M_w$, of at least $2*10^5$, and an elongational viscosity (measured at a temperature of 170° C., at a rate of elongation of $0.03\ s^{-1}$ and at a time of 10 s), EV(170/10), of at least $1.4*10^5$ Pa.s.

The invention relates also to a process for foaming a polymeric composition, as well as to a foamed thermoplastic article.

27 Claims, No Drawings

FOAMABLE POLYMERIC COMPOSITION

This application is a continuation of PCT/NL98/00209 filed Apr. 10, 1998, and claims the benefit of U.S. Provisional Application No. 60/04,331, filed Apr. 15, 1997.

FIELD OF THE INVENTION

The present invention relates to a foamable polymeric composition, and particularly to a foamable thermoplastic elastomer composition comprising a polyolefin and a rubber (TPOE). The present invention also relates to a process for preparing a foamed polymeric article from the composition and to the resultant foamed polymeric article. It particularly relates to a flame retardant foamed polymeric article.

PRIOR ART

A foamable polymeric composition, as well as a foamed polymeric article, on the basis of a thermoplastic elastomer, which comprises a polyolefin and a rubber, is known from U.S. Pat. No. 4,898,760.

This foamable composition and articles prepared therefrom suffer from serious drawbacks. For instance, with foamed articles prepared from foamable compositions in which a polypropylene homo- or copolymer constitutes the thermoplastic phase, the foam cells are undesirably non-uniform. These and other properties need improvement, and particularly so in the case of low density foamed articles (density less than 600 kg/m$^3$).

SUMMARY OF THE INVENTION

The foamable polymeric composition of the present invention provides a solution for the above problems. The invention resides in the use of a specific type of polypropylene homo- or copolymer, as a result of which improved polymeric foams are obtainable.

The invention deals with a foamable polymeric composition, comprising a thermoplastic elastomer on the basis of a polyolefin and a rubber, wherein the polyolefin is a polypropylene homo- or copolymer having:

a weight average molecular weight, $M_w$, of at least $2*10^5$, and an elongational viscosity (measured at 170° C., at a rate of elongation of 0.03 s$^{-1}$ and at a time of 10 s), EV(170/10), of at least $1.4*10^4$ Pa.s.

The $M_w$ of the polypropylene is determined using gel permeation chromatografy (GPC), known in the art, at 145° C. The elongational viscosity (hereinafter abbreviated "EV") is determined according to the procedures detailed in Meissner, Acta 8,78,1969 and Meisner, Acta 10,230,1971, the complete disclosures of which are incorporated herein by reference.

DETAILED DESCRIPTION OF THE INVENTION

The present invention recognizes the criticallity of the type of polypropylene to be used in the foamable polymeric composition. It has been found that the use of a polypropylene having the minimum $M_w$ and the minimum EV(170/10) results in a foamed article with improved physical properties; the cell-size is much more uniform, as a result of which a much lower density of the foam can be obtained.

The polypropylene in the composition of the present invention is either a homopolymer or a copolymer of propylene with other olefines. Other olefins that can be used are ethylene or an α-olefin having 4–20 C-atoms; α-olefin with more than 20 C-atoms can also be applied. Preferable the α-olefin is selected from ethylene and α-olefins having 4–10 C-atoms, like pentene-1, 4-methylpentene-1, hexene-1 and octene-1. Also mixtures of α-olefins are applicable. In the case of copolymers the contents of propylene in such a copolymer is at least 75 wt %. The polypropylene polymer is (semi-)crystalline, behaves like a thermoplastic and has a DSC-crystallinity of at least 15% (DSC=differential scanning calorimetry, a known thermometric analytical device). The polypropylene has to have a $M_w$ of at least $2*10^5$, more preferably more than $4*10^5$; the elongational viscosity EV(170/10) of the polypropylene should be at least $1.4*10^4$ Pa.s, more preferably more than $2.0*10^4$ Pa.s.

The polypropylene in the composition of the present invention can also be characterized with an alternative elongational viscosity value: the polypropylene has to have an elongational viscosity (measured at a temperature of 190° C., at a rate of elongation of 0.03 s$^{-1}$ and at a time of 25 sec.), EV(190/25), of at least $1.5*10^4$ Pa.s. More prefered the EV(190/25) has a value of at least $2.5*10^4$ Pa.s.

The polypropylene in the composition of the present invention preferably has a storage modulus (measured at 1 rad/s and at a temperature of 170° C.), G'(170), of at least 6 kPa; more preferably G'(170) is at least 9 kPa.

The polypropylene preferably has a complex viscosity (measured at 1 rad/s and at a temperature of 170° C.), η*(170), of at least 10 kPa.s; more preferably η*(170:) is at least 15 kPa.s.

The polypropylene also has preferably an apparent shear viscosity (measured at 207 s$^{-1}$ and at a temperature of 250° C.) of at least 350 Pa.s; more preferably this apparent shear viscosity has a value of at least 500 Pa.s.

All the (above mentioned) dynamic mechanical properties of the polypropylene present in the composition of the present invention are determined with a Rheometrics Scientific RDA II® rheometer with dual force rebalance transducer.

The polypropylene in the composition of the present invention preferably has a number-average molecular weight, $M_n$, of at least $8*10^4$; more preferably the polypropylene has a $M_n$ of at least $10^5$.

The improvements in polymeric foams obtained by the present invention can preferably be obtained, when not only the polypropylene is of a specific, above identified, nature, but also when the composition is of a specific nature: the foamable polymeric composition comprises a thermoplastic elastomer on the basis of a polypropylene and a rubber, wherein the polypropylene has a $M_w$ of at least $2*10^5$, preferably at least $4*10^5$, and the composition has an apparent shear viscosity (measured at 207 s$^{-1}$ and at a temperature of 200° C.) of at least 250 Pa.s; more preferably this apparent shear viscosity of the composition has a value of at least 300 Pa.s. The composition is found suitable for the preparation of foams according to the present invention, if the composition has a Goettfert Rheotens® elongational viscosity (measured at a temperature of 210° C., at a rate of elongation of 1 s$^{-1}$), GREV, of at least $4.0*10^4$ Pa.s; more preferably, the GREV has a value of at least $5.5*10^4$ Pa.s. For the details of the measurement, reference is given to the Examples.

The effects of the invention become even more apparent, when the composition also contains at least one filler or filler-like material. The filler, which is preferably in its majority present in the polypropylene phase, has a dominant influence on the foamability of the composition, especially in those cases where the polypropylene is the phase which is substantially foamed (such as in the case where the rubber is at least partially vulcanized). The above is valid for all conventional fillers or additives (like pigments, UV-stabilizers, talc, glass fibers, carbon black, etc.). Preferably the filler is a flame retardant.

The rubber in the TPOE used according to the invention can be any rubber known in the art, provided that the rubber is stable under the foaming conditions. Preferred rubbers are butyl rubber (copolymer as well as terpolymer, and also in its halogenated form); ethylene/α-olefin copolymer rubber (EAM) as well as ethylene/α-olefin/diene terpolymer rubber (EADM); acrylonitrile/butadiene rubber (NBR); styrene/butadiene rubber (SBR); natural rubber (NR). In case of EAM or EADM rubber, the α-olefin in such a rubber is preferably propylene; in such a case the rubber is referred to as EP(D)M. The amount of rubber in the TPOE is preferably in the range of 25–85 wt %, based on the weight of the polypropylene and the rubber With more preference the TPOE is a thermoplastic polyolefin vulcanizate (TPOEV), in which the dispersed rubber is at least partially cured.

Here and hereinafter a TPOE is called a TPOEV when the rubber in the TPOE has a degree of vulcanization such that the amount of extractable rubber is less than 90%. The test to determine such an extractable amount is generally done with a solvent in which the polyolefin as well as the not-vulcanized rubber are soluble, but in which the vulcanized rubber is not soluble. A suitable solvent is boiling xylene.

By vulcanizing the rubber in a TPOE, the physical properties of the resulting TPOEV, as well as the physical properties of the resulting foamed polymeric article are improved.

The vulcanization of the rubber in a TPOE can be performed with any vulcanization system that is known in the art to vulcanize the rubber in the TPOEV. In the case of EA(D)M-rubber sulphur systems, peroxide systems and preferably vulcanization systems based on a phenolic resin are used. In general, suitable vulcanization agents and systems are described in Hoffman, "Vulcanization and vulcanizing agents", Palmerton Publ. Co, N.Y., 1967)

To enjoy the best effects of the vulcanization, the rubber in the TPOEV is preferably vulcanized to the extent that the amount of extractable rubber is less than 15%, more preferred even less than 5%.

To foam the foamable polymeric compositions, any method known in the art can be used. Chemical as well as physical blowing agents can be used (like azodicarbonamides, low boiling hydrocarbons, water, $N_2$, $CO_2$ or water releasing chemical compounds) The blowing agent can be dry-blended or meltblended with the TPOE (provided that the blend-temperature is below the activation temperature of the blowing agent) or can be mixed in gaseous or liquid form in the molten TPOE. Preferably the foamable polymeric composition contains the blowing agent. The amount of blowing agent is dependant on the type of blowing agent: the more blowing gas is liberated per unit weight of blowing agent, the less is needed for a certain result. The person skilled in the art can readily ascertain the suitable effective amount of the appropriate blowing agent for the particular type of polymeric foam.

The amount of filler in a foamable, filled, polymeric composition is preferably in the range of 5–75 wt %, based on the composition; more preferably, the amount of filler is between 2–45 wt %.

The filler can also function as a flame retardant. In principle, there is no restriction on the type of flame retardant filler in the present invention. By present preference, a halogenated flame retardant-type filler, such as a brominated flame retardant material, is used. The amount of flame retardant is dependant on the requirements. According to the ratings of the flamability tests of Underwriters Laboratories (UL), one can have flamability ratings of HB, V2, V1 or V0, in increasing order of resistance to flames. To meet the ULVO-requirement, an amount of 25–35 wt % flame retardant is generally needed.

Decabromodiphenyl oxide, Saytex® 8010, and PE-68® are examples of flame retardants containing bromine. These brominated flame retardants liberate bromine containing compounds upon heating which quench the reactions that sustain the process of combustion. The efficiencies of the halogenated flame retardants are enhanced by also adding metal oxides such as antimony trioxide in the compositions. At least one part by weight of metal oxide is used for every three parts of halogenated flame retardant for the best results. Most of the halogenated flame retardants are in the powder form, which can be compounded using mixing equipment, such as internal mixer, twin screw extruder, or single screw extruder, etc. The dispersion of the flame retardant throughout the TPOE is critical for optimal resistance to combustion. A foamable flame retardant TPOE can be prepared by mixing a TPOE with a flame retardant package at a temperature above the melting point of the TPOE and below the decomposition temperature of the flame retardant agents using any of the mixing devices mentioned above. A flame retardant TPOE can also be prepared using a one step process during the preparation of the TPOE.

The rubber and, when used, the fillers, have to be well dispersed in the polypropylene material; they should be small enough (size less than about 50 $\mu$m). The larger the size of the rubber or the filler, the worser the foamability of the polymeric composition is; it might even lead to a complete failure in the foaming process.

Next to the indicated polymeric components used in the TPOE of the present invention, additional polymers can be present. One of the possibilities is the presence of styrene based thermoplastic elastomers. Styrene-based thermoplastic elastomers are polymers which consist of polymer chains with a polydiene central block and polystyrene terminal blocks (also called SBCs, styrene block copolymers). The diene block gives the polymer its elastomeric properties, while the polystyrene blocks constitute the thermoplastic phase. By preference, the polydiene block is composed of butadiene units, so that the resulting TPE is an SBS (styrene-butadiene-styrene polymer).

Since the main chain of an SBS contains unsaturations which are oxidation sensitive, the styrene-based TPE preferably is a hydrogenated polymer, i.e. a polymer in which at least part of the aliphatic unsaturation has been hydrogenated. Such products are also referred to as SEBS polymers (styrene-ethylene/butylene-styrene).

Where in the foregoing the presence of styrene and/or butadiene in the STPEs has been mentioned, this is to elucidate rather than to restrict the term 'STPE', considering that an analogous result is to be obtained with polymers comprising blocks of polyisoprene (SIS: styrene-isoprene-styrene) or based on substituted styrene (for example α-methylstyrene).

The invention also relates to a process for preparing a foamed article. The process comprises the following steps:

a) heating a mixture of the foamable polymeric composition of the present invention, and an effective amount of a blowing agent, to a temperature above the melting point of the thermoplastic elastomer, and b) releasing the resulting mixture to atmospheric conditions.

In an alternative process, the foamed article can be prepared by the following steps:

a) heating a thermoplastic elastomer on the basis of a polyolefin and a rubber to a temperature above the melting point of the thermoplastic elastomer;

b) adding a physical or chemical blowing agent and preparing an intimate mixture of the thermoplastic elastomer an the blowing agent, and c) releasing the resulting mixture to atmospheric conditions.

The foaming process can be performed in any equipment that is known and suitable for foaming of a thermoplastic elastomer. By preference an extruder is used. When the same equipment is used for both the mixing process of the blowing agent and the TPOE as well for the foaming process, care has to be taken that the TPOE is first melted and thoroughly mixed with the blowing agent to obtain, preferably an at least substantial uniform distribution of the blowing agent in the TPOE. The resulting mix of the TPOE and the blowing agent is extruded, e.g. through a die, and a foamed TPOE is obtained.

As indicated before, any type of blowing agent or mixture of blowing agents can be used in the process for preparing a foamed polymeric article. Preference, from an environmental standpoint, is given to water or a water-releasing chemical compound (WRC) as the blowing agent. Examples of a WRC are:

metal salts (of group 1–2 of the Period Table) containing hydrate water (like calcium sulphate dihydrate);

metal hydroxides which decompose at elevated temperatures (like aluminium trihydroxide (ATH));

organic diacids, which can be transformed to their anhydride equivalent (like succinic acid);

mixture of ingredients that generate water through a polycondensation reaction (like the formation of a polyester or a polyamide).

In the mixing part of the process (i.e. the mixing of the TPOE and the WRC), whether this is a separate process, or integrated with the foaming process, the temperature should be carefully controlled in order to prevent premature release and volatilization of the water. When the mixture is then heated to conditions where water is released from the WRC and whereafter the pressure is released, the TPOE expands to a foamed article.

In cases where the WRC is capable of exhibiting additional beneficial properties, e.g. also an activity as a flame retardant (like ATH, as an example), there is no requirement that all the WRC is decomposed during the foaming process. As a result a foamed article with improved flame retardancy is obtained. To obtain a flame-retardant foamed article it is also possible to use a combination of a WRC, which behaves like a flame retardant, and standard flame retardants, known in the art.

In the case where water is used during the foaming process, the amount of released water is sufficient to effect foaming, such as an amount in the range of 0,1–5 wt %, relative to the TPOE.

When a process according to the invention is used to prepare a foamed article from a TPOEV, it is preferred that the vulcanization of the TPOEV is completed before the foaming process takes place. Otherwise it can be the case that the foaming process has too much influence on the vulcanization process to obtain acceptable foamed TPOEV articles.

The pressure at which the foaming process takes place is not different from the pressure-range at which conventional foaming of a TPOE takes place.

At the end of the foaming process according to the present invention, the mixture is released to atmospheric conditions, preferably combined with a shaping operation (like the formation of a shaped foamed profile). Here and hereinafter the term "atmospheric conditions" means a pressure having a value of about 0.1 MPa, but the foaming process can also be concluded at a release pressure which is somewhat lower or higher than 0.1 MPa.

The invention also relates to a foamed thermoplastic article, prepared by foaming a mixture comprising a TPOE, and an effective amount of a blowing agent. Such a foamed article preferably has a density in the range of 50–900 $kg/m^3$.

Foamed and filled polymeric articles preferred according to the present invention have a normalized compression stress (at 50% deflection in thickness direction), NCS, of at most $5*10^2$ $m^2/s^2$; more preferably the NCS has a value of at most $3*10^2$ $m^2/s^2$. These NCS values have never been obtained before with commercial foamed polymeric articles, based on a filled TPOE or filled TPOEV and in which polypropylene is the polyolefin.

The compression stress (CS) is the stress (in MPa) required to compress the foamed article to a 50% level of deflection. The NCS is obtained by dividing the CS with the density of the foam (p, in $kg/m^3$); in formula:

$$NCS = \frac{CS}{\rho}$$

The foamed thermoplastic article can find its use in the electronic industry, construction industry, and automotive industry.

The ingredients present in the foamable polymeric composition as well as in the foamed thermoplastic article according to the invention have been described above.

The invention will be elucidated by the following examples and comparative experiments, which are intended to demonstrate, but not to restrict, the invention.

COMPARATIVE EXPERIMENT A AND EXAMPLES I AND II

These Examples and comparative experiment use different homopolymeric polypropylene materials. Molecular weight and molecular weight distribution of these polypropylene samples were determined using a Waters GPC instrument at 145° C., based on polystyrene as the calibration standard. The results of the measurements are given in Table 1, also including the value for Mp, which is the molecular weight at the peak of the GPC-curve. The shear viscosity of these polypropylene samples were measured at 250° C. using a Keyness Galaxy V-B Metric® capillary rheometer. The apparent shear viscosity is shown in Table 1 for each polypropylene sample.

The dynamic mechanical properties of these polypropylene samples were measured using a Rheometrics Scientific RDAII® rheometer with dual range force rebalance transducer. A 25 mm parallel plate geometry was used for all measurements. A frequency sweep (0.01 to 100 radians/s) was conducted for each polypropylene sample at 170° C.

with a strain amplitude of 0.01 and at 210° C. with a strain amplitude of 0.05. A 25 mm diameter disk sample prepared using a compression molding device under nitrogen blanket was loaded into the rheometer which was preset to 210° C. in order to fully melt the polypropylene. The parallel plate fixture was then cooled to the test temperature and kept at that temperature for 5 min. for thermal equilibration. G'(170), G" (loss modulus, at a given frequency and temperature), and complex viscosity $\eta^*(170)$ are shown in Table 1 for each polypropylene sample. The phase angle change, $\Delta\delta$, (from 0.01 to 100 radian/s frequency) is also shown in the same Table. Also included in this Table are the values for the complex viscosity ($\eta^*$) of the polypropylene, measured at a temperature of 210° C. and a frequency of 1 rad/s; also the melt flow indices. (MFI) of the different polypropylenes (measured according to ASTM D-1238 at 230° C. under a load of 2.16 kg) are given.

Elongational viscosity (EV) was measured using a constant strain rate rheometer similar to the design of Meissner elongational viscometer. A cylindrical test specimen prepared using an Instron capillary rheometer at 250° C. was anchored at one end to a force transducer and immersed in a fluid bath at the test temperature for 20 min. before being pulled at a constant velocity at the other end by a pair of rotors. The measurements were conducted at 170° C. or 190° C. with a constant strain rate of 0.03 $s^{-1}$.

TABLE 1

| Properties | Comp. exp. A PP#1 | Example I PP#2 | Example II PP#3 |
|---|---|---|---|
| $M_n$ | 69,919 | 121,142 | 117,621 |
| $M_w$ | 601,715 | 883,621 | 675,287 |
| $M_z$ | 2,231,887 | 1,546,672 | 1,710,796 |
| $M_p$ | 187,756 | 634,685 | 549,955 |
| MFI (g/10 min.) | 3.0 | 0.5 | 0.7 |
| MWD (= $M_w/M_n$) | 8.61 | 7.29 | 5.74 |
| Apparent shear viscosity at 250° C. and 207 $s^{-1}$ $s^-$, Pa · s | 223 | 642 | 555 |
| G' at 170° C. and 1 rad/s, Pa G' (170) | 2,822 | 24,336 | 9,301 |
| G' at 210° C. and 1 rad/s, Pa | 1,187 | 9,643 | 3,376 |
| G" at 170° C. and 1 rad/s, Pa | 3,517 | 27,742 | 14,635 |
| G" at 210° C. and 1 rad/s, Pa | 1,889 | 14,373 | 7,742 |
| Elongational viscosity at 170° C., at 0.03 $s^{-1}$ $s^{-1}$ and at 10 seconds, EV(170/10), Pa · s | 10,000 | 38,000 | 24,000 |
| Elongational viscosity at 190° C., at 0.03 $s^{-1}$ $s^{-1}$ and at 25 seconds, (EV 190/25) Pa · s | 8,000 | 42,000 | 31,000 |
| $\eta^*$ at 170° C. and 1 rad/s, Pa · s $\eta^*$ (170) | 4,509 | 36,903 | 17,340 |
| $\eta^*$ at 210° C. and 1 rad/s, Pa · s | 2,231 | 17,307 | 8,446 |
| $\Delta\delta$ at 170° C. | 30.2° | 58.6° | 54.6° |
| $\Delta\delta$ at 210° C. | 32.4° | 53.2° | 51.4° |

COMPARATIVE EXPERIMENT B AND EXAMPLES III AND IV

These comparative experiment and Examples illustrate the critical effect of Theological properties of the type of polypropylene on the foamability of the final thermoplastic elastomer (TPOE).

The TPOE had a hardness of 75 Shore A based on injection molded plaques. It was a blend of polypropylene and phenolic cured particulate EPDM rubber in a ratio of rubber to plastic of about 55 to 45 by weight. The EPDM rubber in the TPOE had an amount of extractable rubber (in boiling xylene) of about 10%. The foamability of three different TPOE compositions were tested with a slit die using a single screw extruder equipped with a water injection unit. The compositions of these TPOE's are shown in Table 2. A standard flame retardant package and additives in the form of UV stabilizers were incorporated into the TPOE in an extra compounding step, before foaming. Each of these compositions had the same amount and type of EPDM rubber as well as a same filler package, but had different polypropylenes as the continuous plastic phase.

TABLE 2

FLAME RETARDANT TPOE compositions and rheological properties

| Material Polypropylene type used | Comp. exp. B Formulation TPOE#1 PP#1 | Example III Formulation TPOE#2 PP#2 | Example IV Formulation TPOE#3 PP#3 |
|---|---|---|---|
| TPOE, Wt % | 65.2 | 65.2 | 65.2 |
| Brominated flame retardant, wt % (Bromine % = 82) | 25.8 | 25.8 | 25.8 |
| Antimony trioxide, wt % | 8.6 | 8.6 | 8.6 |
| Additives, wt. % | 0.4 | 0.4 | 0.4 |
| Apparent shear viscosity at 200° C. and 207 $s^{-1}$, Pa · s | 209 | 335 | 310 |
| Amount of water (wt. %) | 1.5 | 1.5 | 1.5 |

A Goettfert Rheotens® melt tension instrument was used to determine melt properties of the different thermoplastic elastomer compositions at a melt temperature of 210° C. The melt strand of each sample was elongated by a wheel in the air under non-isothermal condition at an accelerated rate. The force recorded during the test was used to calculate the elongational viscosity. The following Table 3 summarizes the test results:

Die type: capillary

Die length: 30 mm

Die diameter: 2 mm

Piston diameter: 12 mm

Piston speed: 0.9722 mm/s

Output: 0.5 kg/h

Acceleration of strand 60 mm/$s^2$

Strand length 100 mm

Velocity of strand ($V_s$): variable

Wheel velocity at strand breakpoint ($V_b$): variable

TABLE 3

Goettfert Rheotens ® Melt Tension Instrument Test Results for the three different TPOEs

|  | TPOE#1 | TPOE#2 | TPOE#3 |
|---|---|---|---|
| Elongation viscosity at 210° C. and at 1 s$^{-1}$ elongation rate, Pa · s | 28,000 | 86,000 | 67,000 |
| Melt elongation ratio at break ($V_b/V_s$). | 5.4 | 4.8 | 4.9 |
| Melt tensile stress at break, Pa | 130,000 | 240,000 | 190,000 |

The foamability and the properties of the resulting foams are shown in Table 4. The cell structure of the foamed rectangular profiles was determined using an optical microscope.

The foamed profile of TPOE#1 had a rough surface and non-uniform cell structure, and it showed a much higher normalized compression stress (NCS) than the profiles from Examples III and IV. The compositions from Examples III and IV were foamed to much lower densities.

TABLE 4

Properties of TPOE foams

| Property | Comp. Exp. B Foamed TPOE#1 | Example III Foamed TPOE#2 | Example IV Foamed TPOE#3 |
|---|---|---|---|
| Foamability (0 = worst–10 = best) | 2 | 10 | 8 |
| Surface quality (0 = worst–10 = best) | 1 Rough | 10 | 7 |
| Foam density, kg/m$^3$ | 526 | 268 | 260 |
| Dimension of the foamed profile rectangular cross section (mm × mm) | 3.4 × 9 | 4.3 × 13.2 | 5 × 14 |
| Compression Stress at 50% deflection in thickness direction, MPa | 0.45 | 0.057 | 0.064 |
| Cell size range, mm Smallest–largest (Cross flow direction) | 150–500 | 100–270 | 100–250 |
| Elongated cell L/D ratio (Machine direction) | 2:1 | 4:1 | 2.5:1 |
| NCS (m$^2$/s$^2$) * 10$^2$ | 8.5 | 2.1 | 2.5 |

What is claimed is:

1. Foamable polymeric composition, comprising a thermoplastic elastomer on the basis of a polyolefin and an at least partially vulcanized rubber, in an amount in the range of 25–85 wt % based on the weight of the polyolefin and the rubber, wherein the polyolefin is a polypropylene homo- or copolymer having:

a weight average molecular weight, $M_w$ (determined using GPC at a temperature of 145° C.), of at least $2*10^5$, and an elongational viscosity (measured at a temperature of 170° C., at a rate of elongation of 0.03 s$^{-1}$ and at a time of 10 s), EV (170/10) of at least $1.4*10^4$ Pa.s.

2. Foamable polymeric composition according to claim 1, wherein the polypropylene has an EV(170/10) of at least $2.0*10^4$ Pa.s.

3. Foamable polymeric composition according to claim 1, wherein the polypropylene has an $M_w$ (determined using GPC at a temperature of 145° C.) of at least $4*10^5$.

4. Foamable polymeric composition according to claim 1, wherein the polypropylene has a number average molecular weight, $M_n$, of at least $8*10^4$.

5. Foamable polymeric composition according to claim 4, wherein the polypropylene has a $M_n$ of at least $10^5$.

6. Foamable polymeric composition, as defined in claim 1, wherein the polyolefin is a polypropylene homo- or copolymer having:

a weight average molecular weight, M, of at least $2*10^5$, and an elongation viscosity (measured at a temperature of 190° C., at a rate of elongation of 0.03 s$^{-1}$ and at a time of 25 s), EV (190/25), of at $1.5*10^4$ Pa.s.

7. Foamable polymeric composition according to claim 6, wherein the polypropylene has an EV(190/25) of at least $2.5*10^4$ Pa.s.

8. Foamable polymeric composition according to claim 1, wherein the polypropylene has a storage modulus (measured at 1 rad/s and at a temperature of 170° C.), G'(170), of at least 6 kPa.

9. Foamable polymeric composition according to claim 8, wherein the G'(170) has a value of at least 9 kPa.

10. Foamable polymeric composition according to claim 1, wherein the polypropylene has a complex viscosity (measured at 1 rad/s and at a temperature of 170° C.), η(170), of at leant 10 kPa.s.

11. Foamable polymeric composition according to claim 10, wherein the η*(170) is at least 15 kPa.s.

12. Foamable polymeric composition according to claim 1, wherein the polypropylene has an apparent shear viscosity (measured at 207 s$^{-1}$ and at a temperature of 250° C.) of at least 350 Pa.s.

13. Foamable polymeric composition according to claim 12, wherein the apparent shear viscosity of the polypropylene has a value of at least 500 Pa.s.

14. Foamable polymeric composition as defined in claim 1, wherein the polyolefin is a polypropylene homo- or copolymer having a weight average moleculmr weight, $M_s$, of at least $2*10^5$ and wherein the composition has an apparent shear viscosity (measured at 207 s$^{-1}$ and at a temperature of 200° C.) of at least 250 Pa.s.

15. Foamable polymeric composition according to claim 14, wherein the apparent shear viscosity of the composition has a value of at least 300 Pa.s.

16. Foamable polymeric composition as defined in claim 1, wherein the polyolefin is a polypropylene homo- or copolymer having a weight average molecular weight, $M_w$, of at least $2*10^5$, and wherein the composition has a Goettfert Rheoteno elongational viscosity (at 210° C., at a rate of elongation of 1 s$^{-1}$), GREV, of at least $4.0*10^4$ Pa.s.

17. Foamable polymeric composition according to claim 16, wherein the GREV has a value, of at least $5.5*10^4$ Pa.s.

18. Foamable polymeric composition according to claim 14, wherein the polypropylene has an $M_w$ of at least $4*10^5$.

19. Foamable polymeric composition according to claim 1, wherein the composition also comprises a filler.

20. Foamable polymeric composition according to claim 19, wherein the major portion of the filler is present in the polypropylene.

21. Foamable polymeric composition according to claim 1, wherein the major portion of the filler is present in the polypropylene.

22. Foamable polymeric composition according to claim 19, wherein the filler is a flame retardant.

23. Foamable polymeric composition according to claim 1 wherein the rubber is selected from the group comprising ethylene/propylene/ (diene) terpolymer rubber (EP (D) M), acrylonitrile/butadiene rubber (NBR), styrene/butadiene rubber (SBR) and butyl rubber.

24. Foamable polymeric composition according to claims 1, wherein the composition also comprises a blowing agent.

25. Foamable polymeric composition according to claim 19, wherein the tiller is present in an amount of 2–75 4 wt %.

26. Foamable polymeric composition according to claim 25, wherein the filler is present in an amount of 5–45 wt %.

27. Foamable polymeric composition according to claim 22, wherein the flame retardant is a halogenated flame retardant.

* * * * *

UNITED STATES PATENT AND TRADEMARK OFFICE
CERTIFICATE OF CORRECTION

PATENT NO. : 6,221,964 B1
DATED : April 24, 2001
INVENTOR(S) : Brzoskowski et al.

It is certified that error appears in the above-identified patent and that said Letters Patent is hereby corrected as shown below:

Column 10,
Line 15, please change "M" to -- Mw --.
Line 32, please change "leant" to -- least --.
Line 44, please change "moleculmr" to -- molecular --; and change "M," to -- Mw --.
Line 55, please change "Rheoteno" to -- Rheotens --.

Column 11,
Lines 8-10, please delete Claim 21, because it is identical to claim 20.

Column 12,
Line 3, please change "claims" to -- claim --.
Line 6, please change "tiller" to -- filler --; and change "2-75 4" to -- 2-75 --.

Signed and Sealed this

Ninth Day of April, 2002

Attest:

JAMES E. ROGAN
*Attesting Officer*    *Director of the United States Patent and Trademark Office*